R. MÜLLER & H. BÖCKEL.
Manufacture of Iodine and Bromine.
No. 219,004. Patented Aug. 26, 1879.
2 Sheets—Sheet 1.
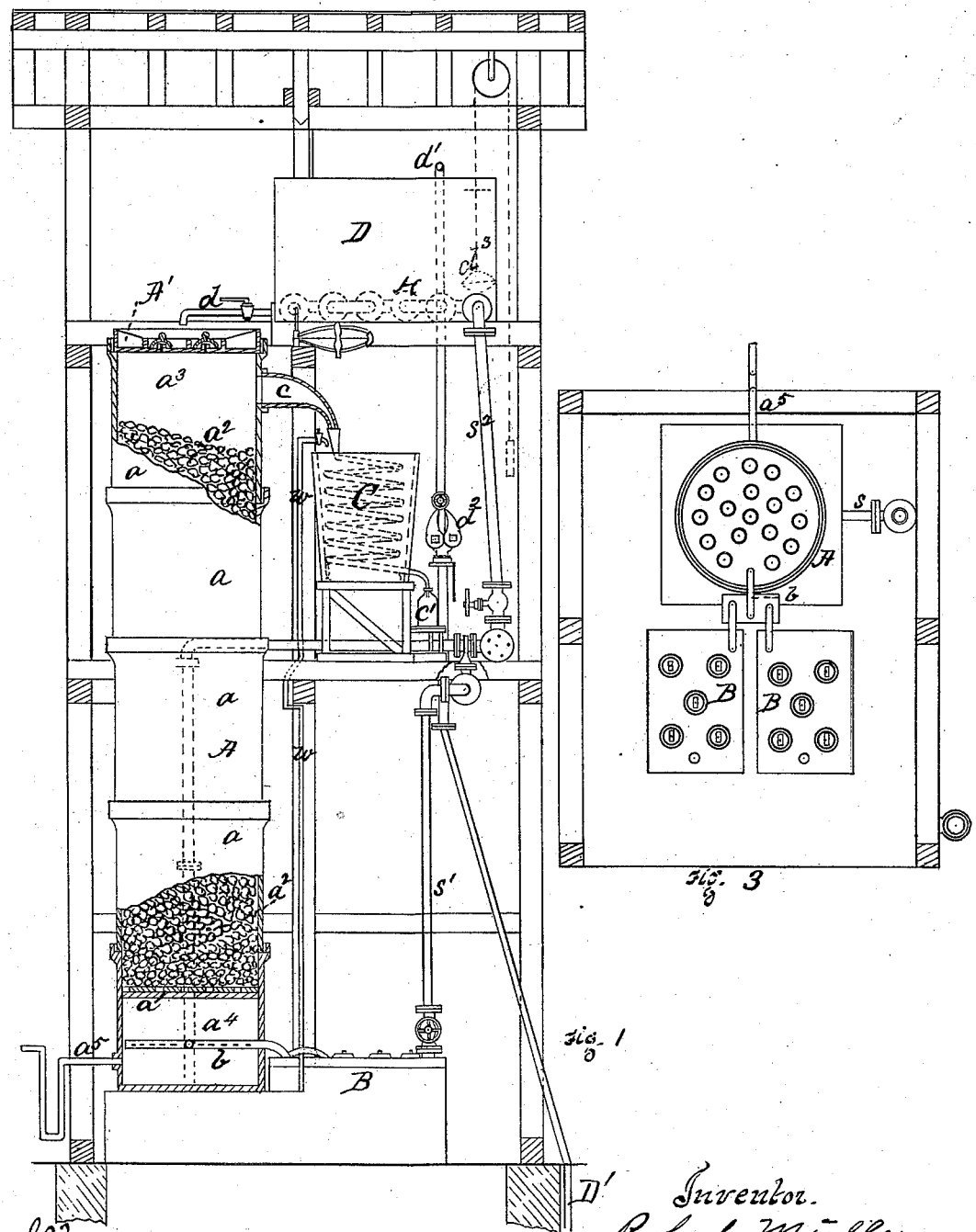

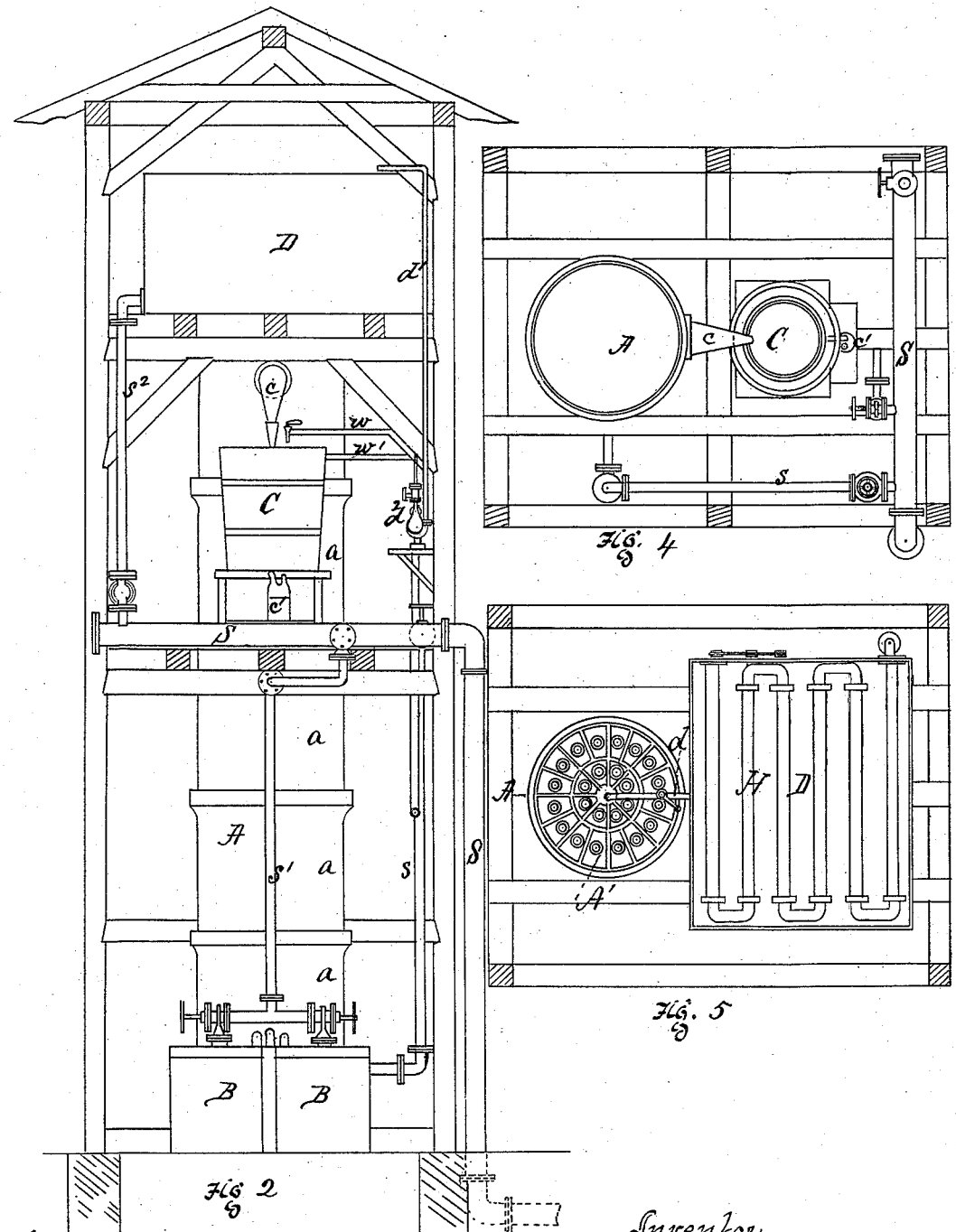

UNITED STATES PATENT OFFICE.

ROBERT MÜLLER AND HERMANN BÖCKEL, OF SCHOENBECK, PRUSSIA, GERMAN EMPIRE.

IMPROVEMENT IN MANUFACTURE OF IODINE AND BROMINE.

Specification forming part of Letters Patent No. 219,004, dated August 26, 1879; application filed May 1, 1879.

*To all whom it may concern:*

Be it known that we, ROBERT MÜLLER and HERMANN BÖCKEL, both of Schoenbeck, Prussia, German Empire, have invented a new and useful Improvement in Process and Apparatus for Producing Iodine and Bromine, of which the following is a specification, reference being had to the accompanying drawings, forming part of this specification, in which—

Figures 1 and 2 are side elevations of devices embodying our invention, the bromine-tower being partly in section. Fig. 3 is a top view of the chlorine-stills and sectional view of the lower part of bromine-tower. Fig. 4 is a view of a section of the bromine-tower and top view of the condenser. Fig. 5 is a top view of bromine-tower and bittern-vat.

Like letters refer to like parts wherever they occur.

Our invention relates to a method or process and means or apparatus for obtaining iodine and bromine from bittern and other fluids containing the same; and consists, first, in subjecting the hot liquid while percolating through a mass of broken coke, fire-brick, or like substance to the action of chlorine gas, which, combining with the sodium, calcium, magnesium, or other elementary bodies, liberates the bromine and iodine, which latter are condensed and obtained in a pure condition; second, in the combination of a tower or hollow column partially filled with broken coke, fire-brick, or like inert substance, a chlorine still or device for generating chlorine and delivering the same to the tower, and a condenser adapted to condense any iodine and bromine vapors which are liberated in the tower or column; third, in the combination of the tower or hollow column partially filled with fire-brick or coke, or like inert substance adapted to divide up any liquids flowing through the tower, with a chlorine still or device for generating chlorine and delivering the same to the still, a condenser to condense the vapors escaping from the column or tower, and a heater for heating the liquid before its admission to the tower; fourth, the combination, in apparatus for making bromine, iodine, &c., of a tower or hollow column through which the liquid to be treated percolates, a still for delivering chlorine gas to the column, a heater for heating the liquid before its treatment, a condenser for condensing the vapors given off by the column, and a pump or equivalent means for forcing the bittern to the heating-tank.

Heretofore in the manufacture of iodine and bromine several methods have been adopted, such as the addition of sulphuric and hydrochloric acids and binoxide of manganese to the bittern, and subsequently heating the same until the reactions which liberated the iodine and bromine took place, after which the iodine and bromine were recovered by distillation; or, the more commonly-practiced method has been to force currents of chlorine gas through the boiling bittern or like fluid containing the iodine and bromine until the tint of the liquid showed those elements to have been liberated, then to distill over and condense the iodine and bromine. But the objection to said processes is their uncertainty, for if the chlorine is in excess a volatile chloride will be formed, which will pass off and be lost, while if an insufficiency of chlorine is present the iodine and bromine compounds will not be fully decomposed. Moreover, by the processes recited the iodine and bromine obtained are more or less impure, requiring further treatment, all of which is laborious, and adds greatly to the cost of manufacture.

The object of the present invention is to simplify, cheapen, and expedite the manufacture in quantity of bromine and iodine.

We will now proceed to describe our invention, so that others skilled in the art to which it appertains may apply the same.

Within a suitable structure, for the protection of the same, we erect a hollow column or tower, A, of such dimensions as the amount of fluid to be treated demands. This tower may be built of wood, stone, fire-clay, or equivalent substance which will not injuriously affect or be injuriously affected by the chemicals, and, if preferred, may be composed of sections $a\ a\ a$, as shown, the sections, in such case, being properly luted to make tight joints. It may be round or square, or have any other shape.

A short distance from the bottom of the hollow column or tower A is arranged a perforated diaphragm, $a^1$, and the interior of the tower above the diaphragm is filled to near the top with broken coke, fire-brick, or other inert substance, $a^2$, which will break up and divide into thin films any liquid passing through the tower. This construction leaves the open spaces $a^3$ $a^4$ at the top and bottom of the tower A.

The lower space, $a^4$, is provided with a trap-pipe, $a^5$, for discharging any liquid accumulating therein, and receives the delivery-tube $b$ of the chlorine-stills B, which are arranged at or near the base of the tower or column A. The top of tower or column A is closed by a distributing cap or cover, A', so constructed as to act as a trap, to trap in the fluid, and a seal to prevent the escape of vapors.

$c$ indicates a tube or pipe leading from the top of the tower to a condenser, C, which delivers into any suitable vessel or receptacle, $c^1$.

Arranged over the condenser C, or at any suitable point above the column or tower A, is a tank for holding bittern or other fluid which contains the iodine and bromine, said tank, provided with a discharge-pipe, $d$, having a suitable cock, by which the quantity of liquid fed to the tower or column A can be graduated, and also supply-pipe $d^1$, through which, by means of pump $d^2$, or its equivalent, the bittern is pumped from a suitable reservoir, D'. In order to be able to determine at any time the amount of liquid in tank D, a float, $d^3$, or equivalent gage, is employed.

In carrying out our process heat is indispensable. We therefore provide a main steam pipe or conduit, S, from which a steam-pipe, $s$, supplies the tower or column A, entering the same at the bottom, and delivering into space $a^4$. A second pipe, $s^1$, supplies the chlorine-stills B, while a third, $s^2$, supplies a heater, H, arranged in the bittern-tank D. $w$ indicates the pipe for supplying the condenser C with water, and $w'$ the overflow-pipe of the condenser.

The above, or their equivalents, constitute devices adapted for carrying out our process, and operate as follows: The stills B having been supplied with the substance from which the chlorine is to be generated, and the tank D having been filled with bittern or other liquid from which iodine and bromine are to be recovered, steam is turned onto the heater H and the liquid heated to, or nearly to, the boiling-point, after which the cock in discharge-pipe $d$ is set to feed the liquid gradually to the column or tower A. The liquid entering tower A is divided up into thin films, and gradually percolates through the coke, broken brick, or like substance, $a^2$. Steam having also been turned onto the chlorine-stills, chlorine gas will be generated or set free, and, escaping by pipe $b$ into the chamber $a^4$ of tower or column A, will pass up through the coke or broken fire-brick $a^2$, coming in intimate contact with the thin films of bittern water under the most favorable conditions for the decomposition to take place. The disengaged iodine and bromine vapors, rising to the space $a^3$, are carried over into the condensers C, where condensation takes place, resulting in the production of a very pure article.

If the vapors of iodine and bromine should be mixed with some chlorine in the lower part of the tower A, they will be freed from the same as they rise toward the top of the tower, as they must necessarily come in contact with large quantities of fresh liquid containing substances for which the chlorine has greater affinity; consequently their purity and freedom from chlorine when they reach the condenser is guaranteed.

The spent fluid will accumulate at the base of the tower in chamber $a^3$, from which it is drawn off by trap-pipe $a^5$, having been previously agitated and freed from any remaining vapors of iodine or bromine by the steam admitted to the bottom of the tower through steam-pipe $s$.

It will be noticed that the process throughout is continuous and uninterrupted, so that there can be no liability of the chlorine being supplied in excess, as any excess which may exist below in the tower will be corrected as the vapors rise. The spreading and breaking up of the liquid into thin films presents it to the gas under the most favorable conditions for reactions to take place quickly and thoroughly.

In the drawings two chlorine vessels or stills, B, are shown as connected to the tower A by a single tube, $b$. Of these but a single vessel or still is used at a time, a series of valves being provided to cut off either still, so that one still can be charged while the other is in operation, thus rendering the whole process a continuous one.

We are aware that hollow towers or columns filled, or partially filled, with coke, fire-brick, or other suitable material not affected by acids or gases, and affording a large surface, have heretofore been used as absorbers and condensers in recovering nitrous gas, in the manufacture of sulphate of soda, to condense and recover hydrochloric acid, and for various other purposes, and we do not herein claim such devices.

We are aware that steam and chlorine gas have been passed through a series of distilling-vessels containing the bromine and iodine, yielding liquor, the gases of bromine, &c., from the first stills of the series being caused to pass through the liquid in the succeeding stills of the series, and the vapors from the final still being conducted to a condenser; and also that the several distilling-vessels of the series have been connected by transfer-pipes, so that the liquid from any single still could be discharged into the next lower still of the series, and do not claim such a method or devices, as by such method the liquid is treated in a body, while our method and apparatus are devised for treating the liquid in a thin film or finely-divided state, whereby the chemical reactions take place more rapidly and uniformly.

Having thus described the nature, operation, and advantages of our invention, what we claim, and desire to secure by Letters Patent, is—

1. The process herein described for obtaining iodine and bromine from bittern or other liquids containing them, which consists in subjecting the bittern in a finely-divided and heated state to the action of chlorine gas, substantially as and for the purpose specified.

2. The combination, in apparatus for the manufacture of bromine and iodine, of the vessel for generating chlorine, the tower or column partially filled with broken brick or like substance, and the condenser, the several elements relatively arranged and operating substantially in the manner and for the purpose specified.

3. The combination of the tower or hollow column partially filled with coke or fire-brick, the vessel for generating chlorine gas, the condenser for condensing the iodine and bromine vapors, and the tank for supplying the column with hot bittern or like liquid, substantially as and for the purpose specified.

4. The combination of the tower or hollow column partially filled with coke, fire-brick, or like substance, the vessel for generating chlorine and delivering the same to the tower, the condenser, the supply-tank, and the series or system of steam-pipes for heating the tank, tower, and chlorine-generator, substantially as and for the purpose specified.

In testimony whereof we have signed our names to this specification in the presence of two subscribing witnesses.

ROBERT MÜLLER.
HERMANN BÖCKEL.

Witnesses:
EDWARD P. MacLEAN,
HERMANN KRIESMANN.